J. RANKIN.
Harrow.
No. 77,091. Patented April 21, 1868.
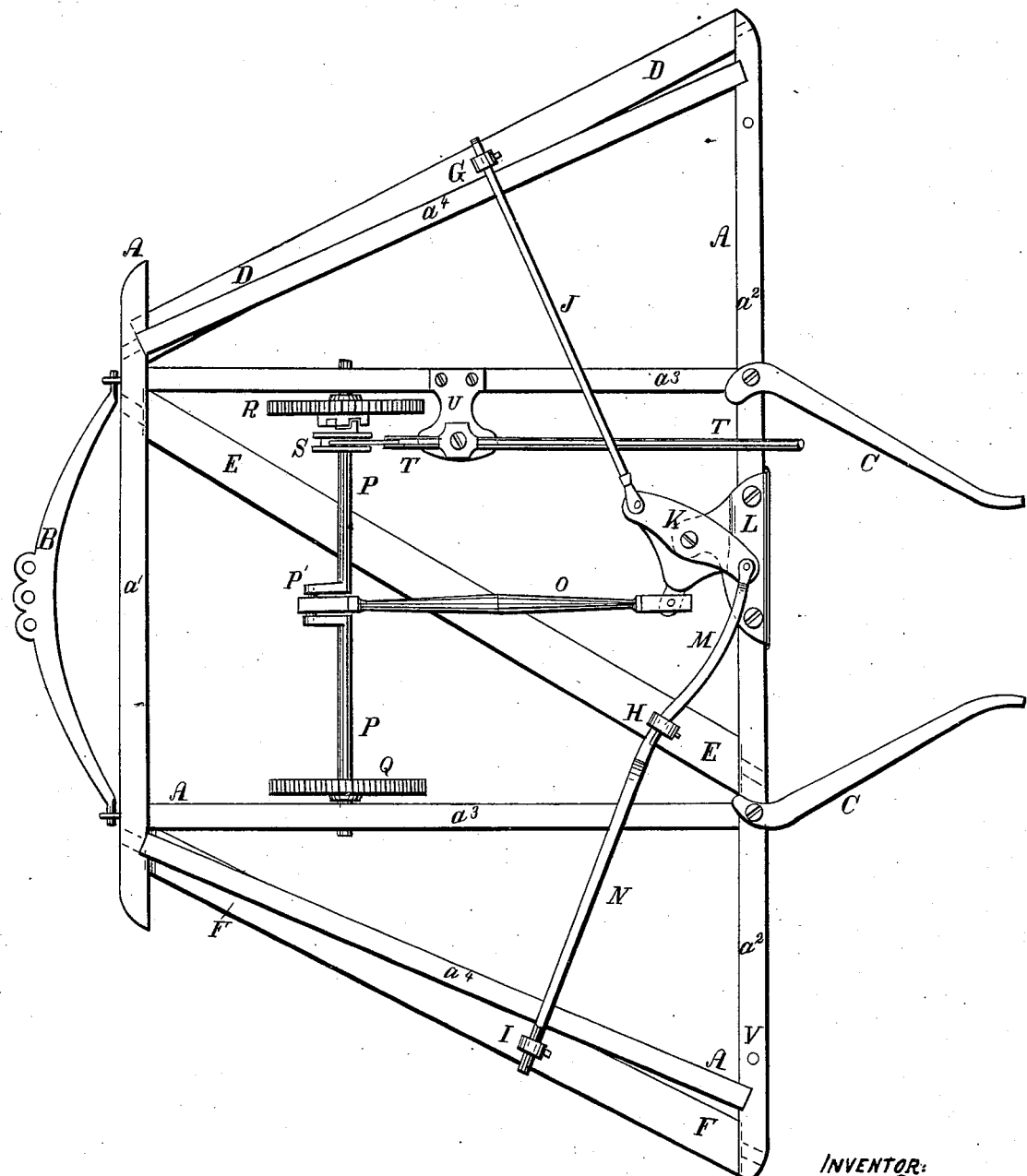
WITNESSES:
INVENTOR:

United States Patent Office.

JOHN RANKIN, OF TAUNTON, MASSACHUSETTS.

Letters Patent No. 77,091, dated April 21, 1868.

IMPROVEMENT IN HARROWS.

The Schedule referred to in these Letters Patent and making part of the same.

TO ALL WHOM IT MAY CONCERN:

Be it known that I, JOHN RANKIN, of Taunton, in the county of Bristol, and State of Massachusetts, have invented new and useful Improvements in Harrows; and I do hereby declare that the following is a full, clear, and exact description thereof, which will enable others skilled in the art to make and use the same, reference being had to the accompanying drawings forming part of this specification.

The figure is a top or plan view of my improved harrow.

My invention has for its object to furnish an improved harrow, simple in construction, easily operated, and effective in operation, and which will do its work better and more thoroughly than the harrows now in general use; and it consists in the construction and combination of the various parts, as hereinafter more fully described.

A is the harrow-frame, consisting of the front cross-bar $a^1$, rear cross-bar $a^2$, central longitudinal bars $a^3$, and inclined side-bars $a^4$, all of which bars are arranged and securely framed together as shown in the figure. B is a curved draught-bar, the ends of which are pivoted to the front cross-bar $a^1$, and which is furnished with several holes for the attachment of the draught, so that the draught-point may be shifted according to the position in which it is desired that the harrow should be drawn.

C are the handles, by means of which the harrow is guided, and which are attached to the rear cross-bar $a^2$, as shown in the drawing.

D E F are the bars, in which ordinary harrow-teeth are inserted in the ordinary manner. The bars D E F are placed in inclined positions, as shown in the figure, and their ends are pivoted to the front and rear cross-bars $a^1$ and $a^2$, as shown in the drawing.

To the bars D E F, towards their rear ends, are attached standards G H I, projecting upward.

J is a pitman, the outer end of which is pivoted in the slotted upper part of the standard G, and the other end of which is pivoted to an arm of the three-armed plate K, which is pivoted to a support, L, attached to the rear cross-bar, $a^2$, of the frame A.

To the opposite arm of the pivoted plate K is attached the end of the pitman M, the other end of which is pivoted to the slotted upper part of the standard H.

N is a pitman, one end of which is pivoted to the standard H, and the other end of which is pivoted to the standard I, so that the bars D E F may all be oscillated or rocked by the oscillation of the three-armed pivoted plate K.

The pitmen J M N are all adjustably pivoted to the standards G H I, so that the throw or movement of the teeth-bars D E F may be regulated at pleasure.

To the third arm of the pivoted plate K is pivoted the rear end of the pitman O, the forward end of which is pivoted to the double crank $p'$, formed upon the shaft or axle P.

The axle P revolves in bearings attached to the central longitudinal bars, $a^3$, of the frame A.

Q is a wheel rigidly attached to one end of the shaft P, so as to carry the said shaft with it in its revolution.

R is a wheel, revolving loosely upon the axle P, upon the inner end of the hub of which is formed a clutch, upon which the clutch S, sliding upon the axle P, takes hold, to cause the axle P and wheel R to move together.

The faces of the wheels Q and R are corrugated or toothed, to prevent them from slipping, and to enable them to take a surer hold upon the ground.

T is the clutch-lever, the forward end of which rides upon the clutch S. The lever T is pivoted to a support or fulcrum, U, attached to one of the central longitudinal bars $a^3$, and its rear end extends back into such a position as to be easily reached and operated by the driver.

By withdrawing the clutch S from the wheel R, and allowing the said wheel to run loosely upon the axle P, the harrow may be more readily turned when required.

V are pins inserted in holes in the rear cross-bar, $a^2$, near its ends, to mark the ground, to serve as a guide to regulate the lap of the harrow in returning.

I claim as new, and desire to secure by Letters Patent—

The harrow constructed as described, and consisting of the bars $a^1$ $a^2$ $a^3$ $a^4$, toothed rock-shafts D E F, having standards G H I, crank-shaft P, bearing loose wheel R, and fixed wheel Q, clutch S, lever T, three-armed pivoted lever K, and pitmen J M N O, all arranged and operating in the manner and for the purpose herein set forth.

JOHN RANKIN.

Witnesses:
ELISHA BASSETT,
GEORGE M. REED.